United States Patent [19]
Linck et al.

[11] Patent Number: 5,311,715
[45] Date of Patent: May 17, 1994

[54] EXPANSION JOINT FLEXIBLE SEAL

[75] Inventors: Ed Linck, Kemah, Tex.; Neil R. Raskin, Rancho la Costa; V. Swaminathan, El Cajon, both of Calif.

[73] Assignee: Pyropower Corporation, San Diego, Calif.

[21] Appl. No.: 598,250

[22] Filed: Oct. 16, 1990

[51] Int. Cl.⁵ .............................. E04B 1/62
[52] U.S. Cl. ...................... 52/396; 52/406.1
[58] Field of Search ............ 52/395, 396, 406; 404/49

[56] References Cited

U.S. PATENT DOCUMENTS

| | | | |
|---|---|---|---|
| 3,068,763 | 12/1962 | Harza | 52/396 X |
| 3,141,206 | 7/1964 | Stephens | 52/406 X |
| 3,606,826 | 9/1971 | Bowman | 404/49 |
| 3,813,180 | 5/1974 | O'Brill | 52/396 X |
| 3,967,911 | 7/1976 | Miers | 52/396 X |
| 3,998,015 | 12/1976 | Scott et al. | 52/406 X |
| 4,007,994 | 2/1977 | Brown | 52/396 X |
| 4,041,665 | 8/1977 | de Munck | 52/396 |
| 4,866,898 | 9/1989 | LaRoche et al. | 52/396 |
| 4,899,512 | 2/1990 | DeGooyer | 52/396 |
| 4,967,527 | 11/1990 | Gohlke | 52/396 |

FOREIGN PATENT DOCUMENTS

| | | | |
|---|---|---|---|
| 0100208 | 2/1984 | European Pat. Off. | 404/49 |
| 82091 | 9/1934 | Sweden | 52/396 |
| 776713 | 6/1957 | United Kingdom | 52/396 |

*Primary Examiner*—Carl D. Friedman
*Assistant Examiner*—Lan C. Mai
*Attorney, Agent, or Firm*—Baker, Maxham, Jester & Meador

[57] ABSTRACT

An expansion joint and flexible seal for refractory lined flues includes a flexible insulating body having a pair of end faces, a pair of lateral faces and a longitudinal dimension. The flexible seal further includes a filter element positioned adjacent to one of the end faces and extending in the longitudinal dimension. The filter element is attached to the insulating body and the assembly may be placed with other seal assemblies in endwise fashion around the periphery of a pair of opposing flue members. A further external pressure seal is provided, mounted to each end of the flue elements.

15 Claims, 3 Drawing Sheets

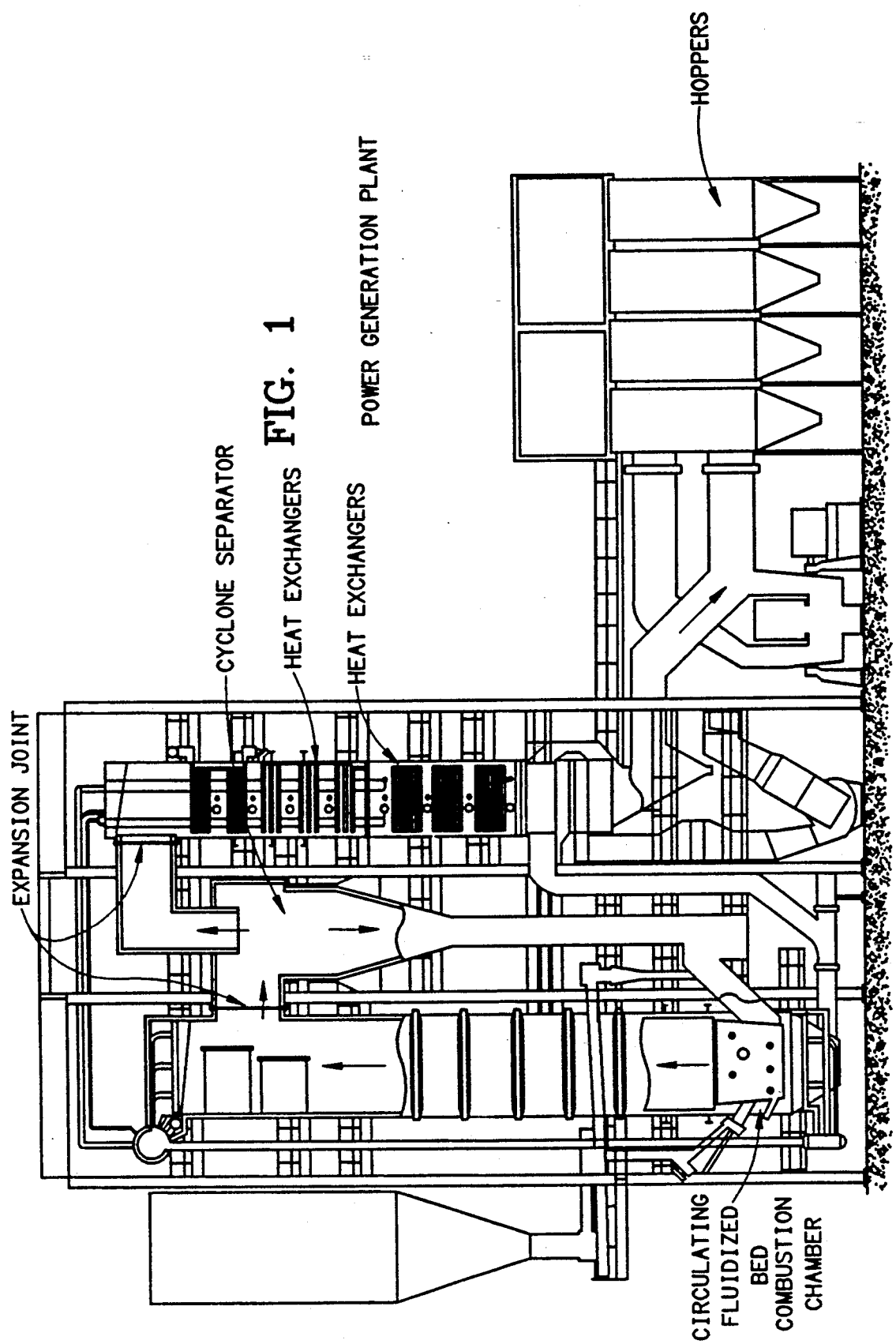

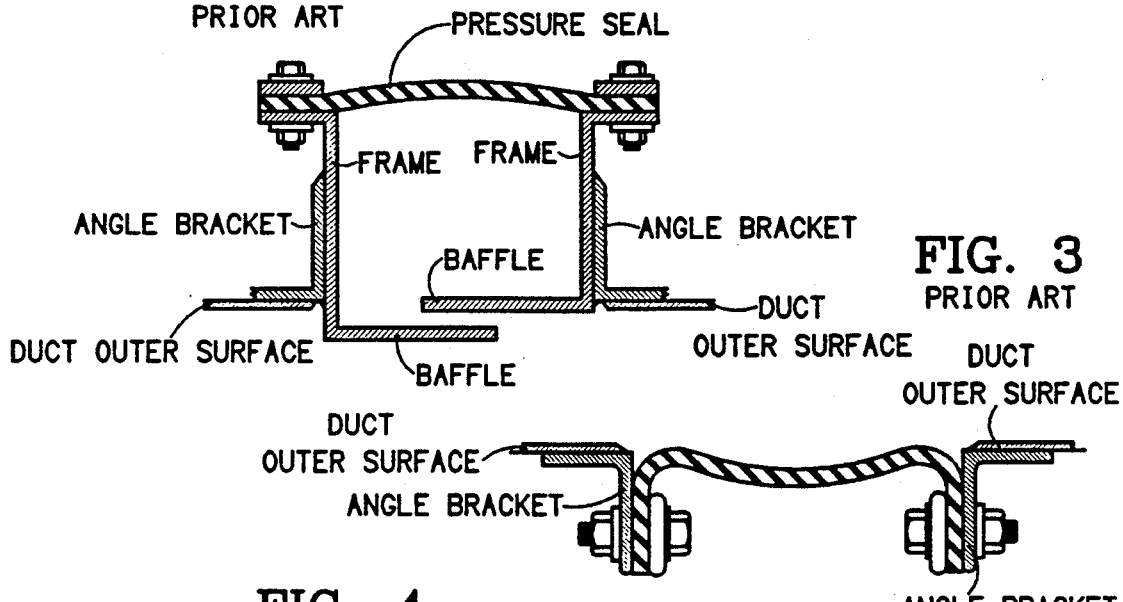
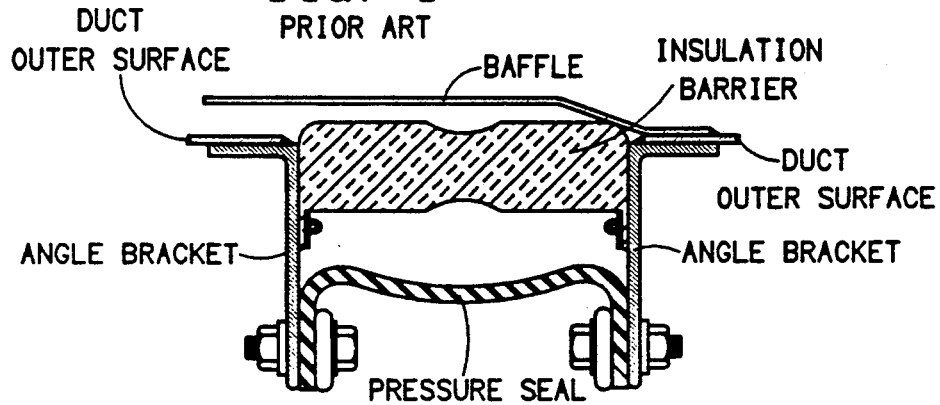
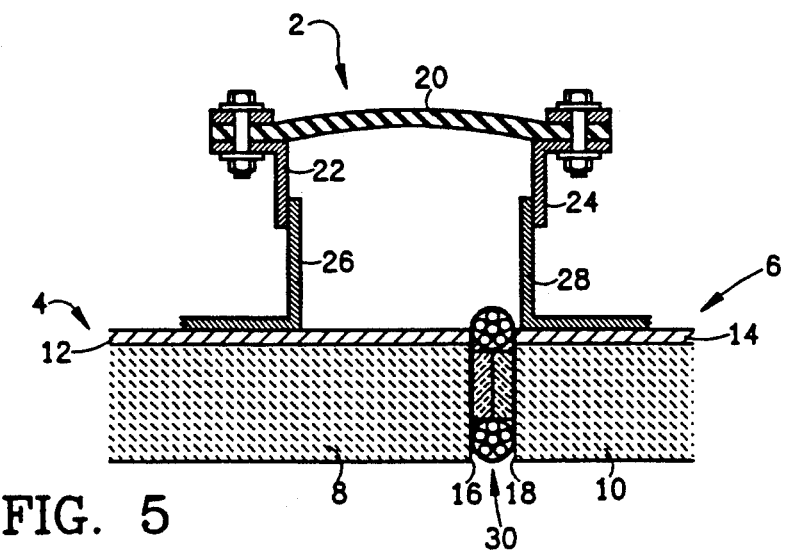

EXPANSION JOINT FLEXIBLE SEAL

BACKGROUND OF THE INVENTION

The field of the present invention is expansion joints for ducting and flue systems, and more particularly, nonmetallic flexible expansion joints to provide stress relief in refactory lined flue systems used in high temperature applications such as power generation and related activities.

In power generating or cogeneration plants, including facilities for obtaining usable electrical power or processing steam/hot water from the burning of solid, liquid or gaseous fuel products, hot flue gases generated by the combustion process are typically directed through a series of processing areas to remove particulates and environmentally hazardous components before finally being exhausted from the facility. FIG. 1 illustrates a power generation plant of unique design that includes a furnace having a circulating fluidized bed (CFB) wherein various fuel materials are combusted. The hot flue gases containing combustion by-products are transferred from the furnace through a flue/expansion joint to a cyclone separator. The cyclone separator diverts heavier combustion particulate matter back to the CFB and the fine particulate matter and hot flue gases are directed through a heat exchanger. The fine particulate matter is then diverted to a particulate filter for disposal. Gases emitted from the facility will have most of the combustion by-product emissions, including $NO_x$, $SO_2$, CO, particulates, etc., removed therefrom, resulting in an environmentally safe means of power generation.

Nonmetallic flue expansion joints are flexible connectors designed to provide stress relief in flue systems by absorbing movement caused by thermal changes. They also act as vibration isolators, and in some instances, make up for minor misalignment of adjoining flues or equipment. They may be fabricated from a wide variety of nonmetallic materials, including synthetic elastomers, fabrics, insulation materials and other suitable materials depending upon the designs thereof. Since their introduction in the early 1960's, the use of nonmetallic expansion joints has continuously grown. The advent of more rigid emission standards has caused the use of more complex flue work systems. Nonmetallic expansion joints have been used in place of the traditional all metal expansion joints to solve problems caused by the thermal and mechanical stresses generated in these complex systems. Although the major user of the nonmetallic joint continues to be the power generation industry, the use of this product has expanded into many other industries wherein gases are conveyed including pulp and paper plants, refineries, steel mills, foundries, smelters, cement plants, kilns, refuse incineration, marine applications, vapor-heat-dust recovery, food processing, and HVAC (Heating, Ventilating and Air Conditioning).

A typical prior art nonmetallic expansion joint is shown in FIG. 2. The joint includes a pair of angle brackets mounted to the respective ends of a pair of adjoining ducts or flues. A pair of frame members are in turn attached to the angle brackets. The frame members have mounted thereto a flexible pressure seal that extends around the periphery of the expansion joint. The pressure seal may be of the elastomeric type for operation below 400 degrees F or may be of the composite type for operation at temperatures continuously above 400 degrees F. It will be appreciated that the flexible pressure seal allows relative axial, transverse, angular and rotational movement between the respective ducts while preventing the escape of pressurized flue gasses and particulates carried therein. Other nonmetallic expansion joint constructions may be seen in the "Technical Handbook" published by the Ducting Systems Nonmetallic Expansion Joint Division of the Fluid Sealing Association, 2017 Walnut Street, Philadelphia, Pa. 19103 (2nd Edition), the contents of which are fully incorporated herein by this reference.

It is known that nonmetallic expansion joints are prone to failure from the build-up of abrasive particulates carried by the flue gas stream, which can accumulate in the expansion joint in such quantities that they eventually rupture the pressure seal. Moreover, fly ash and other particulates can cause damage to the expansion joint by solidifying to a cementatious state. Also, certain non-cementatious particulates (fly ash) can create a severe, corrosive (acidic) environment when subjected to cooling (below the $H_2SO_4$ dew point) during a maintenance outage.

To prevent premature expansion joint failure from the build up of particulate matter therein, baffles have been proposed to help direct particulate matter beyond the expansion joint, as shown in FIG. 2. Other proposals include mounting the flexible pressure seal substantially flush with the interior surface of the duct or flue, as shown in FIG. 3, or mounting an insulation barrier behind a baffle arrangement as shown in FIG. 4. Although these proposals may exhibit varying degrees of effectiveness in minimizing expansion joint failure, the arrangement of FIG. 3 may result in thermal transfer on the inner face of the expansion joint and abrasion from particulates in the gas stream. A greater setback would be desirable. The arrangement of FIG. 4 may result in the insulation barrier rubbing on the baffle under negative pressures. Moreover, the insulation barrier must be fixedly attached to both sides of the joint, which may complicate joint construction and also impart adverse loads on the barrier.

Accordingly, there is an evident need for an expansion joint flexible seal which not only prevents particulate build up, but which is durable, easy to install and will perform satisfactorily despite joint movement. It would be further desirable to provide an expansion joint flexible seal that also performs a sealing function to provide an additional gas sealing barrier.

The present invention accomplishes the foregoing objects and advantages. It is therefore an object of the present invention to provide an improved expansion joint and flexible seal therefor.

It is a further object of the present invention to provide an expansion joint having a flexible seal that is not adversely affected by relative joint movement.

It is a further object of the present invention to provide an expansion joint having a modular construction for easier installation.

It is a further object of the present invention to provide an expansion joint and flexible seal therefor providing an additional gas sealing barrier.

SUMMARY OF THE INVENTION

The present invention employs concepts for an expansion joint and flexible seal therefor that accomplish the foregoing objects and advantages. In accordance therewith, an expansion joint may include flexible seal means having flexible insulating body means and filter means positioned adjacent thereto. Additional filter element means may be provided, as well as flexible seal mounting means for easy installation and joint accessibility.

BRIEF DESCRIPTION OF THE DRAWINGS

The objects, advantages and features of this invention will be more clearly perceived from the following detailed description when read in accordance with the accompanying drawing in which:

FIG. 1 is a diagrammatic view of a fluidized circulating bed power generation plant that includes expansion joints in the ducting system thereof;

FIG. 2 is a detailed cross-sectional view of a prior art expansion joint having a baffle system to prevent premature joint failure;

FIG. 3 is a detailed cross-sectional view of another prior art expansion joint having a flush mounted flexible pressure seal also designed to eliminate premature joint failure;

FIG. 4 is a detailed cross-sectional view of still another prior art expansion joint having an insulation barrier and baffle system also designed to minimize premature joint failure;

FIG. 5 is a detailed cross-sectional view of a nonmetallic expansion joint and flexible seal constructed in accordance with the present invention;

DETAILED DESCRIPTION OF PREFERRED EMBODIMENTS

Figure 6:
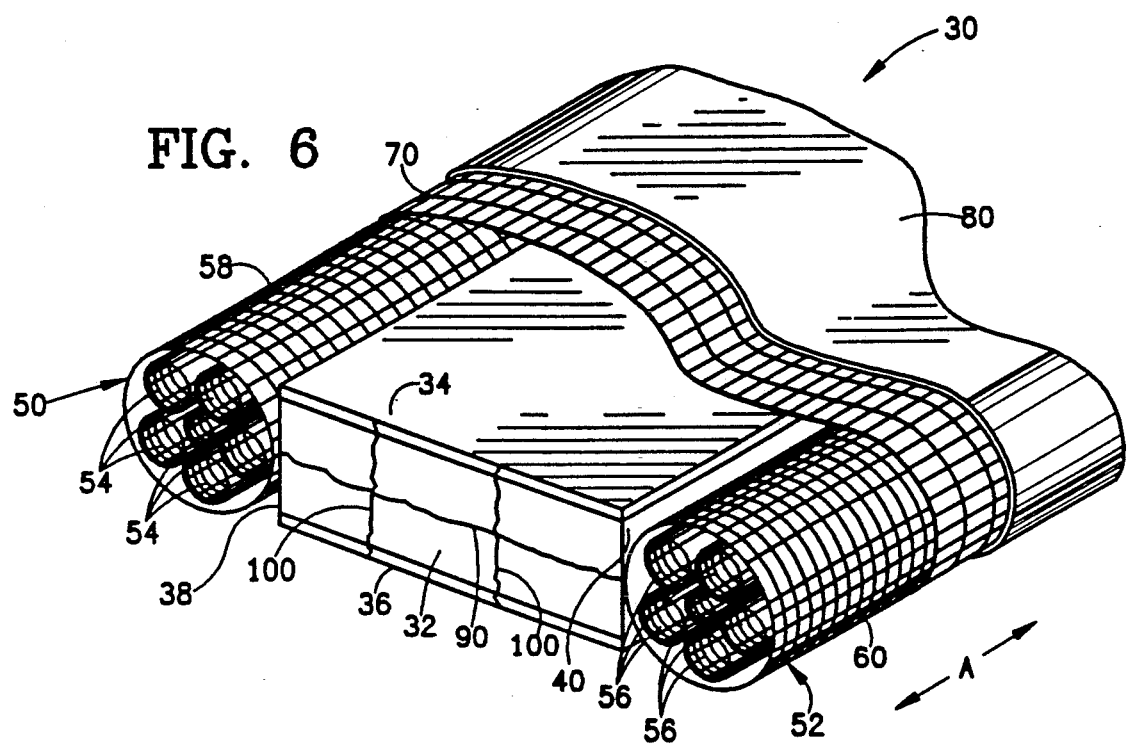
FIG. 6 is a detailed isometric view of a flexible seal constructed in accordance with the present invention having a portion broken away for clarity.

Referring now to FIG. 5, the invention may be embodied in structural form in a nonmetallic expansion joint 2 provided between a pair of refractory lined flues 4 and 6. The flues 4 and 6 include respective refractory portions 8 and 10 and metallic outer shell portions 12 and 14, respectively. The flue sections 4 and 6 terminate at respective terminal faces 16 and 18 which are positioned to form a gap extending around the periphery of the duct sections. There is also conventionally provided a pressure seal assembly including a flexible pressure seal 20 fastened in conventional fashion to a pair of angle frames 22 and 24 which are in turn mounted to a pair of angle brackets 26 and 28 that are permanently attached by welding or other means to the metallic shell portions 12 and 14 of the flues 4 and 6. Disposed in the gap formed by the terminal flue faces 16 and 18 is a flexible seal assembly 30, the details of which will now be described.

Turning now to FIG. 6, the flexible seal assembly 30 includes a flexible insulating body 32 made from a ceramic fiber blanket material of suitable density, such as blown or spun alumina silicate material, and a pair of insulating side panels 34 and 36 also made from a ceramic fiber board material of suitable density providing a pair of lateral or side faces adapted for positioning adjacent and parallel to the respective terminal flue faces 16 and 18. The flexible insulating body 32 further includes a pair of end faces 38 and 40 adapted to be positioned generally perpendicularly to the terminal flue faces 16 and 18. The insulating body further includes a longitudinal dimension extending in a direction shown by the arrow A, so as to generally extend along the perimeter of the flue elements 4 and 6.

The flexible seal 30 further includes a pair of filter elements 50 and 52 positioned adjacent to the respective end faces 38 and 40 and extending in the longitudinal direction of the insulating body. The filter elements are preferably formed from a wire mesh material arranged in a plurality of wrapping arrangements. Thus, a suitable wire mesh material such as 304 SS wire mesh may be rolled into a series of tubes 54 and 56. To form the filter element 50, a plurality of the tubes 54 may be arranged in a bundle, with one of the tubes 54 serving as a central core tube, and wrapped in a larger wire mesh wrapping 58 to complete the filter element 50. Similarly, the filter element 52 can be formed by a plurality of wire mesh tube elements 56 arranged around a central core tube to form a tube bundle, with the bundle being wrapped in a larger wire mesh wrapping 60 to form the filter element 52. Alternatively, the filter elements 50 and 52 could be formed from a pair of solid core flexible hoses. Other filter constructions could also be employed.

Means are provided for securing the filter elements 50 and 52 to the insulating body 32 in the form of a wire mesh wrapping 70 that extends around the filter elements and the insulating body. The wire mesh wrapping may also be 304SS wire mesh. The assembly 30 may be further secured in an exterior flexible casing or wrapping 80 formed from high temperature plastic, or other material. Other wrapping configurations would also no doubt be possible. For example, there may be provided a thin (e.g. one-sixteenth inch) ceramic fiber paper covering under the exterior wrapping 80.

The flexible seal assembly 30 may further be secured with a wire mesh cloth 90 extending between the filter elements 50 and 52, through the insulating core 32. There may be also provided a pair of transverse tie-wires 100 extending through the insulating core 32 and side panels 34 and 36. The transverse tie wires 100 may be anchored in the external wire mesh wrapping 70.

Figure 7:
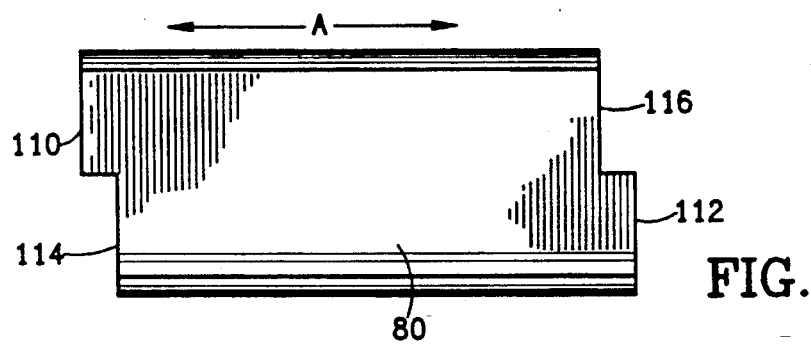
FIG. 7 is a plan view of the flexible seal of FIG. 6 having end portions adapted for interlocking with adjacent flexible seal elements.

Turning now to FIG. 7, the flexible seal assembly 30 includes end portions 110 and 112 having respective cut-outs 114 and 116 formed therein to provide for interlocking arrangement of successive seal assemblies disposed around the periphery of the flues 4 and 6.

Figure 8:
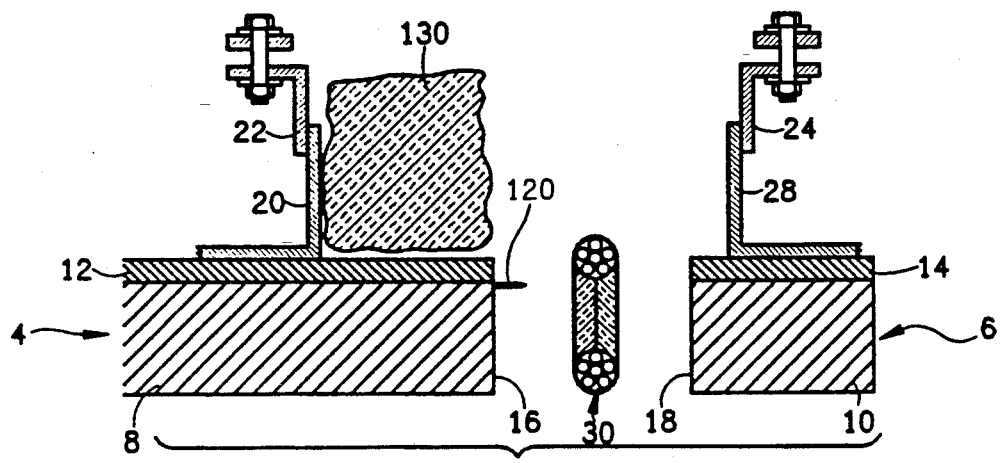
FIG. 8 is an exploded detailed cross-sectional view of a nonmetallic expansion joint and flexible seal constructed in accordance with the present invention.

As further shown in FIG. 8, the modular seal assemblies 30 may be easily joined in forming the expansion joint tube by initially mounting the seal assemblies on pin members 120 extending from the terminal face 16 of the flue 4 attached to the flue 4. Once the seal assemblies 30 are arranged around the periphery of the flue 4 on the pins 120, the adjoining flue section 6 may be applied into place against the seal assemblies 30 until the seal assemblies are moderately compressed. The external pressure seal may then be attached to the angle frame members 22 and 24 to complete the seal. Alternatively, additional insulative material 130 may be placed between the angle brackets 26 and 28 and the pressure seal 20 attached thereafter. The insulative material 130 will provide an additional insulative barrier between the hot duct flue gases and the external pressure seal.

It is understood that the foregoing description and accompanying illustrations are merely exemplary and are in no way intended to limit the scope of the invention. Various changes and modifications to the preferred embodiments should be apparent to those skilled in the art. Such changes and modifications could be made without departing from the spirit and scope of the invention. Accordingly, it is intended that all such changed and modifications be covered by the appended claims and equivalents.

What is claimed is:

1. A flue and duct system expansion joint flexible seal comprising:
    a flexible insulating body having a pair of end faces, a pair of lateral faces and a longitudinal dimension;
    a filter element positioned adjacent one of said end faces and extending in said longitudinal dimension, said filter element being made from a wire mesh material; and
    means for securing said filter element to said insulating body.

2. A flue and duct system expansion joint flexible seal comprising:
    a flexible insulating body having a pair of end faces, a pair of lateral faces and a longitudinal dimension;
    a filter element positioned adjacent one of said end faces and extending in said longitudinal dimension, said filter element including a wrapping of wire mesh cloth; and
    means for securing said filter element to said simulating body.

3. A flue and duct system expansion joint flexible seal comprising:
    a flexible insulating body having a pair of end faces, a pair of lateral faces and a longitudinal dimension;
    a filter element positioned adjacent one of said end faces and extending in said longitudinal dimension, said filter element including a plurality of wire mesh elements wrapped in a larger wire mesh wrapping; and
    means for securing said filter element to said insulating body.

4. A flue and duct system expansion joint flexible seal comprising:
    a flexible insulating body having a pair of end faces, a pair of lateral faces and a longitudinal dimension;
    a filter element positioned adjacent one of said end faces and extending in said longitudinal dimension; and
    means for securing said filter element to said insulating body including a wire mesh wrapping around said filter element and said insulating body.

5. The flexible seal of claim 4 wherein said means for securing said filter element to said insulating body further includes a flexible casing that encases said wire mesh wrapping.

6. A flue and duct system expansion joint flexible seal comprising:
    a flexible insulating body having a pair of end faces, a pair of lateral faces, and a longitudinal dimension;
    a filter element positioned adjacent one of said end faces and extending in said longitudinal dimension, said filter element including a pair of filter elements positioned on said end faces; and
    means for securing said filter elements to said insulating body including a tie fastened to said filter elements and extending through said insulating body.

7. A flue and duct system expansion joint flexible seal comprising:
    a flexible insulating body having a pair of end faces, a pair of lateral faces and a longitudinal dimension, said insulating body including a central insulating core and a pair of simulating side panels providing said lateral faces;
    a filter element positioned adjacent one of said end faces and extending in said longitudinal dimension, said filter element including a wrapping of wire cloth; and
    means for securing said filter element to said insulating body.

8. The flexible seal of claim 7 wherein said filter element includes a plurality of wire mesh elements wrapped in a larger wire mesh wrapping.

9. The flexible seal of claim 8 wherein said means for securing said filter element to said insulating body includes a wire mesh wrapping around said filter element and said insulating body.

10. The flexible seal of claim 9 wherein said means for securing said filter element to said insulating body further includes a flexible casing that encases said wire mesh wrapping.

11. The flexible seal of claim 10 further including a second filter element positioned adjacent one of said end faces and extending along said longitudinal dimension.

12. The flexible seal of claim 11 wherein said means for securing said filter element to said insulating body includes a tie fastened to said filter elements and extending through said insulating body.

13. An expansion joint flexible seal comprising:
    a flexible insulating body made from a ceramic fiber blanket material having a pair of end faces, a pair of lateral faces and a longitudinal dimension, said insulating body including a central insulating core and a pair of insulating side panels providing said lateral faces;
    a filter element positioned adjacent one o said end faces and extending in said longitudinal dimension, said filter element including a plurality of wire mesh tube elements wrapped in a larger wire mesh wrapping; and
    means for securing said filter element to said insulating body, said securing means include a wire mesh wrapping around said filter element and said insulating body, and a flexible casing that encases said wire mesh wrapping.

14. The flexible seal of claim 13 further including a second filter element positioned adjacent one of said end faces and extending in said longitudinal dimension.

15. A flue and duct system expansion joint for joining a first flue and a second flue having inner surfaces made from a refractory material, said expansion joint comprising a first flue terminal face, a second flue terminal face, and a flexible seal sandwiched between said first and second flue terminal faces, said flexible seal including a flexible insulating body having a pair of inner and outer end faces oriented generally perpendicularly to said first and second flue terminal faces, a pair of lateral faces generally parallel to and abutting, respectively, said first and second flue terminal faces, and a longitudinal dimension, said flexible seal further including a filter element mounted against said inner end faces of said flexible insulating body, and extending in said longitudinal dimension, said expansion joint further including an external pressure seal mounted to the first and second flues, outwardly from said flexible seal, said flexible seal being mounted to said first flue terminal face by a pin arrangement extending from said frist flue terminal face into said flexible seal insulating body.

* * * * *